June 27, 1944.  R. E. LJUNGKULL  2,352,395
MATERIAL HANDLING APPARATUS
Filed Aug. 28, 1940  3 Sheets-Sheet 2

INVENTOR.
ROLF E. LJUNGKULL
BY
G. H. Braddock
ATTORNEY

June 27, 1944.　　R. E. LJUNGKULL　　2,352,395
MATERIAL HANDLING APPARATUS
Filed Aug. 28, 1940　　3 Sheets-Sheet 3
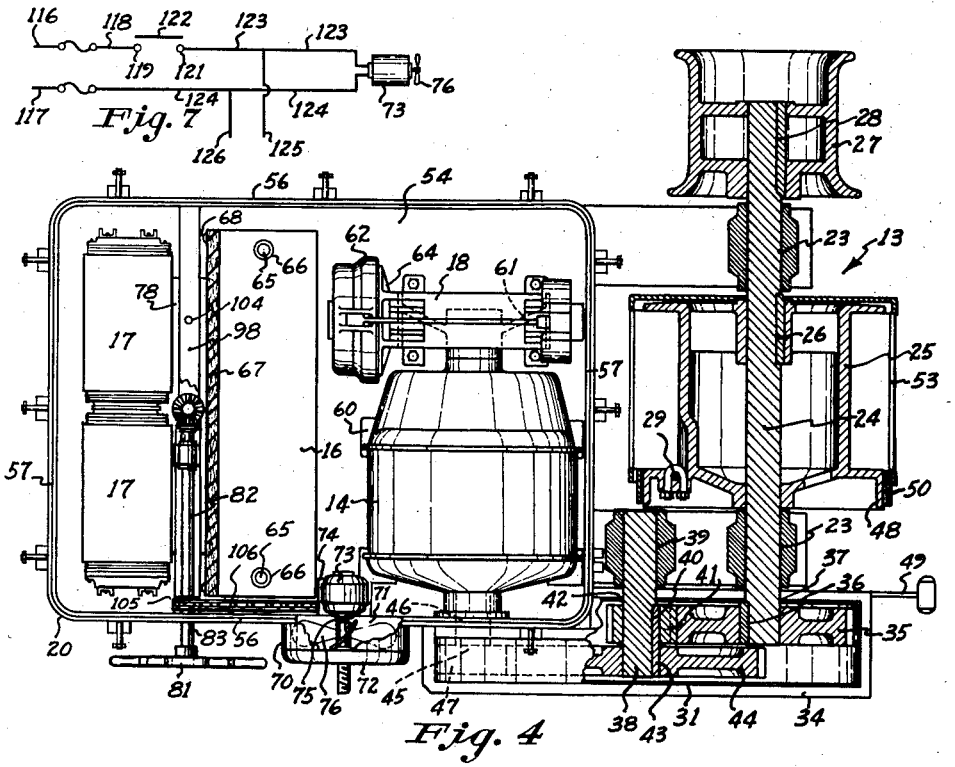
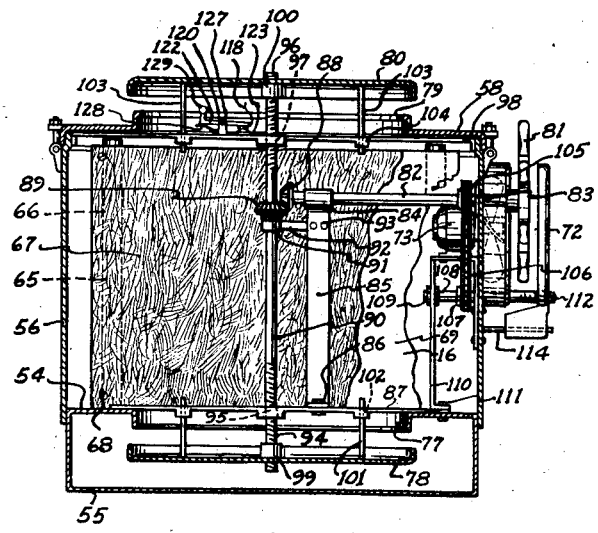
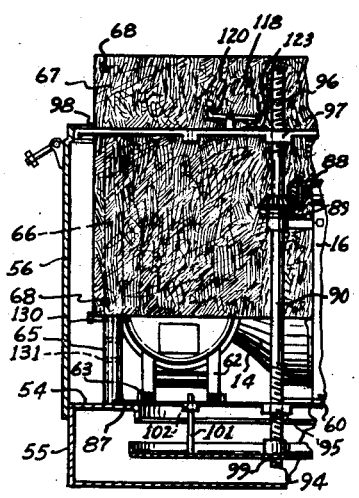
INVENTOR.
ROLF E. LJUNGKULL
BY
G. H. Braddock
ATTORNEY Patented June 27, 1944

2,352,395

UNITED STATES PATENT OFFICE 2,352,395

MATERIAL HANDLING APPARATUS

Rolf E. Ljungkull, St. Paul, Minn., assignor to American Hoist & Derrick Company, St. Paul, Minn., a corporation of Delaware Application August 28, 1940, Serial No. 354,563

13 Claims. (Cl. 172—179)

This invention has relation to material handling apparatus of the character including a winch. More explicitly, the invention relates to material handling apparatus, especially designed for use on cargo transporting vessels, of the type consisting of a cargo winch and mechanism, including electric motor, controller, control panel, resistors, brakes, etc., for effecting operation of said cargo winch.

An object of the invention is to provide material handling apparatus of the nature as set forth wherein will be incorporated various novel features and characteristics of construction designed to render the material handling apparatus an improvement generally over material handling apparatus heretofore known for accomplishing the same purposes.

A further object is to provide material handling apparatus, consisting of a cargo winch and mechanism including electric motor, controller, control panel, resistors, a brake or brakes, etc., for actuating and regulating said cargo winch, which will include new and improved features and characteristics of construction designed with main purposes in view of (1) simplifying the structure of the material handling apparatus, thus to reduce the cost of building a cargo transporting vessel including the material handling apparatus, and of (2) conserving deck room, thus to provide increased cargo transporting space upon the vessel.

And a further object is to provide in the material handling apparatus various improved features and characteristics of construction which will be novel both as individual entities of said material handling apparatus and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 4 is a horizontal sectional view, on the scale of Figs. 2 and 3, taken substantially on line 4—4 in Fig. 1;

Fig. 5 is a vertical transverse sectional view, taken on line 5—5 in Fig. 2, with parts broken away;

Fig. 6 is a fragmentary transverse sectional view, corresponding generally with the disclosure of Fig. 5, but illustrating the control panel as when raised vertically; and Fig. 7 discloses a wiring diagram.

Figure 1:
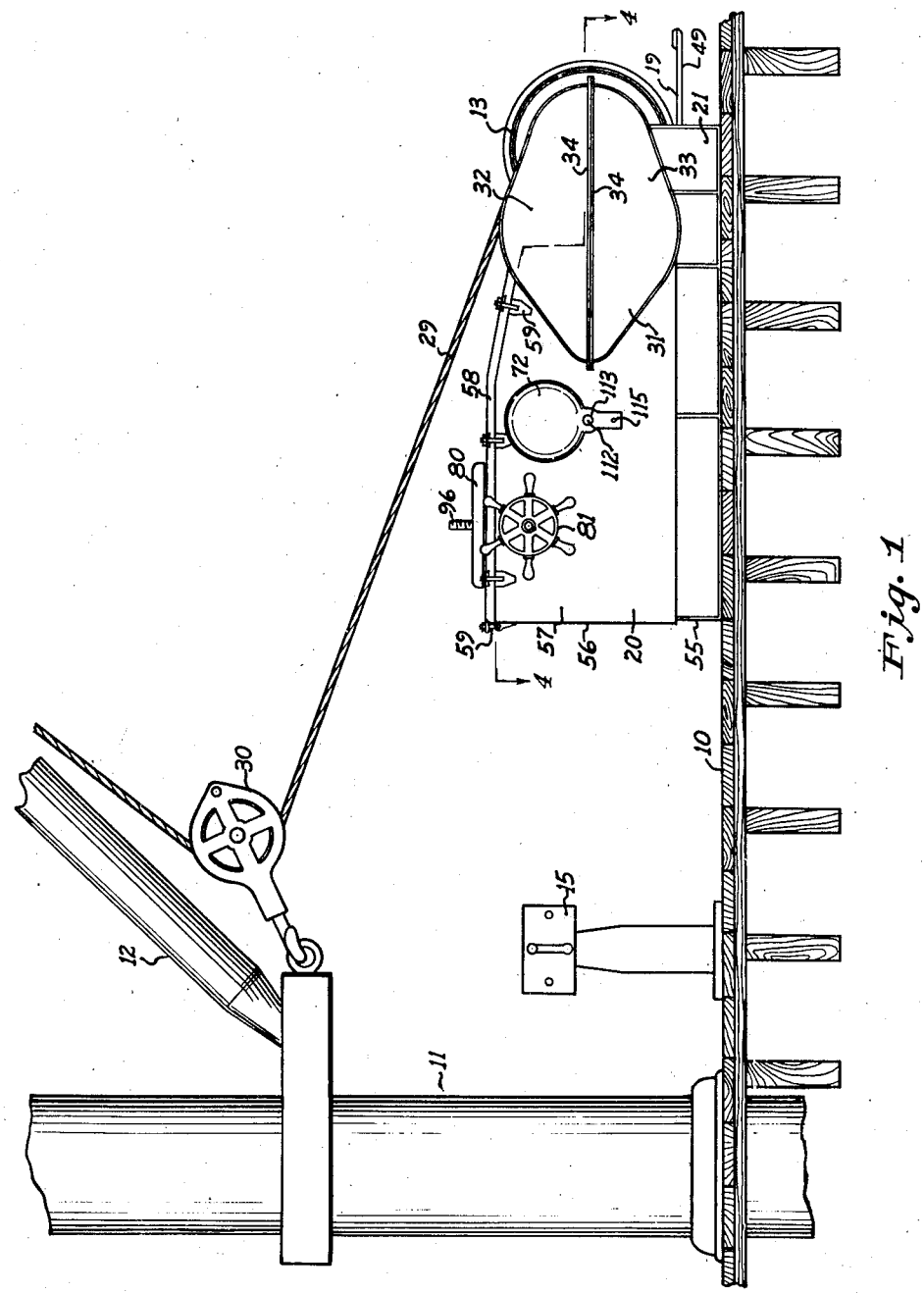
Fig. 1 is an elevational view of material handling apparatus including the features of the invention.
Figure 2:
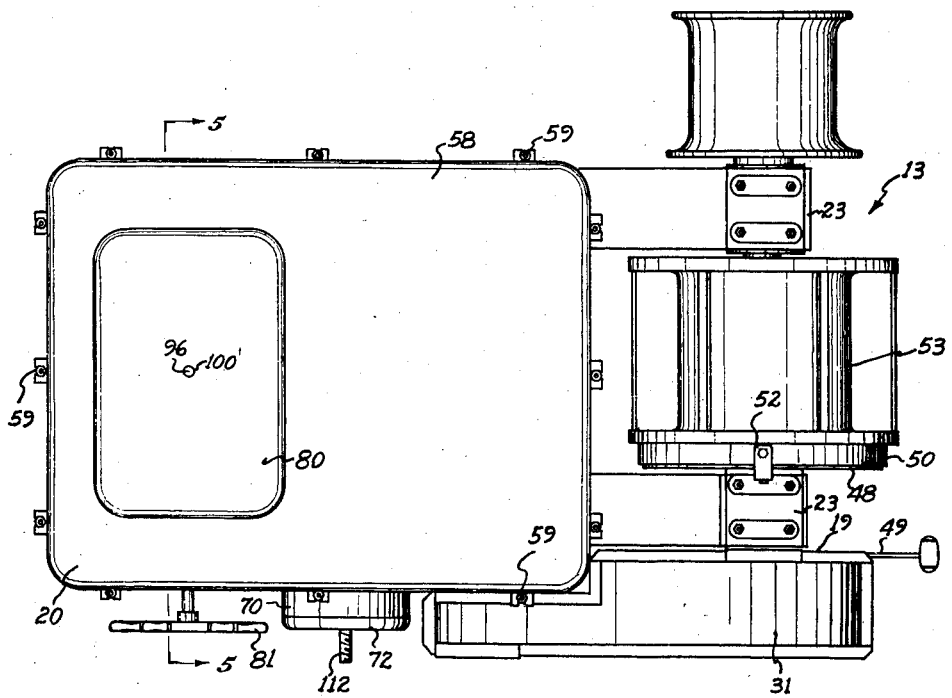
Fig. 2 is a top plan view, on an enlarged scale, of the material handling apparatus of Fig. 1.
Figure 3:
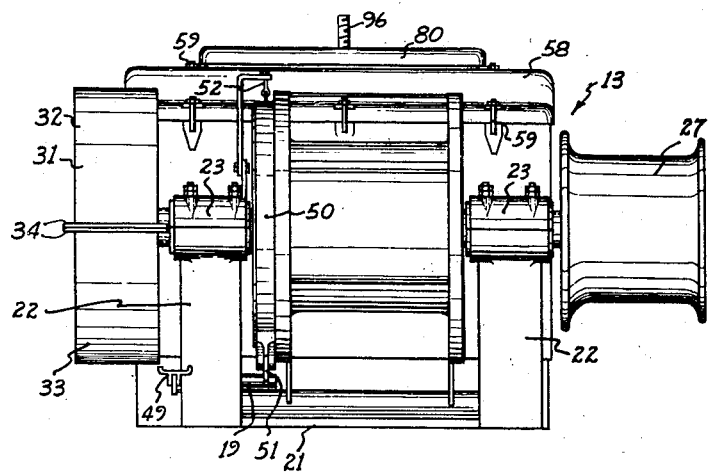
Fig. 3 is an end elevational view of said material handling apparatus as it would appear from the right side of Fig. 2.

With respect to the drawings and the numerals of reference thereon, 10 denotes the deck of a vessel, 11 a mast stationarily situated upon said deck, and 12 represents a boom suitably and conveniently pivotally supported, in ordinary or preferred manner, upon said mast.

The material handling apparatus of the invention includes a cargo winch 13, a main electric motor 14, a controller 15, a control panel 16, resistors 17, an automatic brake 18 for the main electric motor 14, and a manual brake 19 for the cargo winch 13, as well as additional elements adapted to cooperate with the elements mentioned in a manner presently to be set forth. The electric motor 14, the control panel 16, the resistors 17 and the automatic brake 18 are all suitably and conveniently situated and supported within a water-tight housing 20 itself suitably and conveniently supported upon the deck 10. The controller 15 is suitably and conveniently supported upon the deck 10 at a distance from the water-tight housing 20. The cargo winch 13 also is suitably and conveniently supported upon said deck 10, in proximate relation to said water-tight housing 20, and the main electric motor 14 is for the purpose of operating said cargo winch. The automatic brake 18 is associated or assembled with said electric motor 14, and the manual brake 19 is associated or assembled with said cargo winch 13.

More explicitly, the cargo winch 13 includes a bed 21 rested squarely upon the deck 10 and supporting integral, spaced apart, upstanding side frames 22, and said bed and integral side frames are constituted as a unitary structure of electric welded rolled steel. The side frames 22 suitably and conveniently include or provide spaced apart, oppositely disposed bearings 23 for a horizontal drum shaft 24 of the cargo winch disposed transversely of the material handling apparatus. A main drum 25 of said cargo winch, situated between the bearings 23, is fixed, as at 26, upon the drum shaft 24, and a winch head 27 of the cargo winch, situated at a side of one of the bearings 23, also is fixed, as at 28, upon said drum shaft.

The winch head 27 is adapted to be employed for several purposes, including the purpose of actuating a cable (not shown) for adjusting the boom 12 to elevation where it is desired to locate the boom to better perform a material conveying or moving job required to be done. The main drum 25 also is adapted to be employed for several purposes, by actuation of a cable 29, ridable on said main drum and over a sheave 30 supported upon the mast 11, for raising and lowering, or otherwise moving material.

A closed gear case 31 is composed of upper and lower hollow sections, denoted 32 and 33, respectively. Each of said hollow sections 32 and 33 consists of welded together, rolled steel plates and includes a perpendicular, outwardly extending flange 34 at its open side, and the closed gear case is provided by bolting together said flanges 34, the one against the other. Said closed gear case 31 is suitably and conveniently supported by the adjacent side frame of the cargo winch, and is disposed adjacent the outer side of the bearing 23 which is opposite the winch head 27, and contains a gear 35 fixed, as at 36, upon the horizontal drum shaft 24. As will be clear from Fig. 4, said drum shaft passes snugly, as at 37, through the adjacent vertical wall of the closed gear case 31. A horizontal stub shaft 38, at the elevation of and parallel with the drum shaft 24, is rotatably supported in a bearing 39 provided or included by the adjacent side frame 22, and said stub shaft fixedly supports, as at 40, a pinion 41 situated within the closed gear case 31 and meshing with the gear 35. The stub shaft 38 passes snugly, as at 42, through the wall of the closed gear case 31 which receives the drum shaft 24, and fixedly supports, as at 43, a gear 44 also situated within said closed gear case. The end portion of the closed gear case 31 opposite the drum shaft 24 is situated in contiguous relation to an adjacent portion of a vertical side wall of the water-tight housing 20, at the general location of the main electric motor 14, and the driven shaft 45 of said main electric motor passes, in water-tight fashion, as at 46, through the housing wall, as well as snugly through the adjacent vertical wall of said closed gear case. A pinion 47 fixed upon the motor shaft 46 and situated within the closed gear case 31 meshes with the gear 44.

It will be evident that rotation of the main drum 25 and the winch head 27 of the cargo winch 13 will be accomplished by energization of the main electric motor 14. The drive of said main drum and winch head will be through the instrumentality of the motor shaft 45, the pinion 47, the gear 44, the stub shaft 38, the pinion 41, the gear 35 and the drum shaft 24.

The main drum 25 includes an integral brake drum 48, and the manual brake 19 is adapted to the purpose of causing said brake drum 48 to be engaged thus to cause the main drum 25 and the winch head 27 to be brought to rest when this is intentional. More explicitly, said manual brake 19 includes, in addition to the integral brake drum 48, a foot lever 49 suitably and conveniently pivoted upon the cargo winch frame, a brake band 50 in surrounding relation to the brake drum 48, an operative connection, indicated generally at 51, between the foot lever 49 and the brake band 50, and means, denoted generally at 52, for maintaining said brake band in proper surrounding relation to said integral brake drum 48. The construction and arrangement are such that the integral brake drum 48 will be engaged by the brake band 50 upon depression of the foot lever 49 and that said brake band will be removed from engagement with said integral brake drum when said foot lever is released.

The main drum 25 includes an effective cable guard 53 for keeping the cable 29 from becoming loose thus to interfere with smooth operation of the cargo winch. Said cable guard 53 is suitably and conveniently supported upon the cargo winch frame.

The water-tight housing 20 is constituted as a hollow, rectilinear member including a horizontal base 54 of said member suitably and conveniently supported in spaced relation to the deck 10 by a hollow, rectilinear frame 55 rested squarely upon said deck, spaced apart, parallel, vertical side walls 56, 56 and spaced apart, parallel, vertical end walls 57, 57 of said member which are rigid with and extend upwardly from said horizontal base 54 and are integrally joined together at the four corners of said water-tight housing, and a substantially horizontal removable cover 58 of said member releasably fastened down against the upper margins or edges of said vertical side and end walls 56, 56, 57, 57, as by ordinary clamps 59. The rectilinear frame 55 may be a continuation of the bed of the cargo winch. As disclosed, said rectilinear frame 55 consists of welded together steel plates, as does also the water-tight housing 20 with substantially horizontal removable cover 58.

The main electric motor 14 is disposed transversely of the water-tight housing 20, and is rigidly supported, as at 60, upon the horizontal base 54 of the hollow, rectilinear member which constitutes said water-tight housing.

The driven shaft 45 of said main electric motor 14 rigidly supports or carries a braking element, or braking elements, 61 of the automatic brake 18. A frame 62 of said automatic brake, rigidly secured, as at 63, to said horizontal base 54, supports solenoid actuated devices 64 for engaging and releasing the braking element, or braking elements, 61. The automatic brake 18 is of well known structure. It is adapted to be electrically controlled selectively to cause the main electric motor 14 to be brought to rest and released for operation.

The control panel 16 is situated in slightly spaced relation to the main electric motor 14 at the side of said main electric motor opposite the cargo winch 13, and said control panel is disposed transversely of the water-tight housing 20. Said main electric motor 14 and the automatic brake 18 associated or assembled with the main electric motor are situated in proximate relation to the vertical end wall 57 of said water-tight housing 20 which is adjacent said cargo winch 13. The resistors 17 are situated in adjacent relation to the vertical end wall 57 of the water-tight housing 20 which is opposite the cargo winch 13 and in slightly spaced relation to the control panel 16. Said resistors are disposed transversely of the water-tight housing.

Said water-tight housing 20 incorporates a removable cover, such as 58, in order that the equipment of the material handling apparatus which is within the water-tight housing readily can be serviced, as when out of order.

The control panel 16 and the resistors 17 are supported directly upon the horizontal base 54 of the water-tight housing 20. Said resistors 17 are stationarily secured to said horizontal base 54. Said control panel is supported upon said horizontal base to be capable of having vertical movement in order that the control panel may be elevated, for ready servicing, when the horizontal cover 58 is removed, to position above said water-tight housing. More explicitly, spaced apart, vertical guide posts 65 are secured to and extend upwardly from said horizontal base 54, and said control panel 16 includes spaced apart, vertical guide openings or ways 66 snugly slidable on said vertical guide posts. In Fig. 5 of the drawings, the control panel is disclosed as resting upon the horizontal base 54. In Fig. 6, said control panel is disclosed as elevated to position where it is partially above the water-tight housing. A support lug 130, adapted to be removably insertable into spaced apart holes 131 in a vertical guide post 65 beneath the control panel 16, may constitute means for retaining said control panel at desired elevated position. Desirably, the control panel will be bodily removable from said water-tight housing. The guide posts 65 and the guide openings or ways 66 cooperate to provide means for rigidly supporting said control panel when in normal position, as well as guides along which the control panel can be vertically moved.

A heat insulator 67 is situated between the control panel 16 and resistors 17 in order to prevent the passage of heat from said resistors to said control panel. More explicitly, the heat insulator 67 as disclosed is a rectilinear slab of heat resisting material, such as asbestos, having overall dimensions equal to those of the control panel, removably secured, as by screws 68, against and in covering relation to the vertical surface 69 of said control panel which is adjacent said resistors.

A construction and arrangement is included for causing the water-tight housing 20 to be opened up, as well as for causing said water-tight housing to be ventilated, thus to cause heat to be removed from the water-tight housing and its contained equipment.

A blower casing 70 is contiguous with a vertical side wall 56 of the housing 20 and is disposed outwardly of said vertical side wall. The inner portion 71 of the blower casing 70 is wide open to the interior of said housing 20 and the outer portion of said blower casing normally is closed by an adjustable cap 72. A blower motor 73 is suitably and conveniently mounted, as at 74, at the interior of the housing 20. The driven shaft 75 of the blower motor 73 fixedly supports a blower 76 situated within the blower casing 70. As shown, the blower 76 is disposed at location which is generally between the main electric motor 14 and the control panel 16 so that said blower can, when in operation, cause air to travel against and over said main electric motor, said control panel, the resistors 17 and the automatic brake 18.

The horizontal base 54 of the water-tight housing 20 includes an opening 77, of some considerable area, disposed directly below the control panel 16 and the resistors 17, which is normally covered by an adjustable lower closure element 78, and the substantially horizontal removable cover 58 of said housing 20 includes an opening 79, of the same area as the opening 77, disposed directly above said control panel 16 and said resistors 17, which is normally covered by an adjustable upper closure element 80.

The adjustable cap 72, the adjustable lower closure element 78 and the adjustable upper closure element 80 are adapted simultaneously to be moved to open and to closed positions through the instrumentality of manually actuatable means including a hand wheel 81, disposed at the outer side of the water-tight housing 20 in position readily to be accessible, fixedly supported upon a horizontal shaft 82. The horizontal shaft 82 has its outer end portion mounted, as at 83, in the adjacent vertical side wall 56 of the water-tight housing 20 and its inner end portion mounted, as at 84, in a vertical bearing member 85 rigidly supported, as at 86, upon a cross-strip 87 fixed to the horizontal base 54 of said water-tight housing and disposed across the opening 77. The inner end of the horizontal shaft 82 fixedly carries a bevel gear 88 which meshes with a bevel gear 89 fixed upon an intermediate portion of a vertical shaft 90. Said vertical shaft 90 is rotatably mounted, as at 91, against the possibility of longitudinal movement, in a horizontal bearing member 92 made rigid, as at 93, with the vertical bearing member 85. The lower end portion of the vertical shaft 90 is threaded and passes downwardly freely, at 95, through an opening in the cross-strip 87. The upper end portion 96 of said vertical shaft 90 also is threaded and passes upwardly freely, at 97, through an opening in a cross-strip 98, similar to the cross-strip 87, fixed to an upper part of the housing 20 and disposed across the opening 79.

The adjustable lower closure element 78 includes a centrally disposed threaded opening 99 which receives the lower threaded end portion 94 of the vertical shaft 90, and the adjustable upper closure element 80 includes a centrally disposed threaded opening 100 which receives the upper threaded end portion 96 of said vertical shaft 90. The construction and arrangement are such that when the vertical shaft 90 is turned in one direction, by rotation of the hand wheel 81, the adjustable lower and upper closure elements 78 and 80 are caused to move to closed positions and when said vertical shaft is turned in opposite direction said adjustable lower and upper closure elements are adapted to move to open positions. Said lower closure element 78 is held against rotative movement during opening and closing adjustment by spaced apart guide rods 101 upon the lower closure element slidable in guide openings 102 in the cross-strip 87, and said upper closure element 80 is held against rotative movement during opening and closing adjustment by spaced apart guide rods 103 upon the upper closure element slidable in guide openings 104 in the cross-strip 98.

A sprocket wheel 105, fixed upon the horizontal shaft 82 and situated adjacent the inner surface of the vertical side wall 56 of the housing 20 in which said horizontal shaft 82 is mounted, carries a sprocket chain 106 which also rides over a sprocket wheel 107 fixed upon a second horizontal shaft 108 parallel with said horizontal shaft 82. An intermediate portion of the second horizontal shaft 108 is rotatably mounted in the vertical side wall 56 which supports said horizontal shaft 82, and the inner end of said second horizontal shaft is rotatably mounted, as at 109, against the possibility of longitudinal movement, in a vertical bearing member 110 rigidly supported, as at 111, upon the horizontal base 54. The outer end portion 112 of the second horizontal shaft 108 is threaded, and an extension of the adjustable cap 72 includes a threaded opening 113 which receives the outer threaded end portion 112 of said second horizontal shaft 108. The construction and arrangement are such that when the horizontal shaft 82 is turned, by rotation of the hand wheel 81, to cause the adjustable lower and upper closure elements 78 and 80 to move to closed positions, the adjustable cap 72 also is moved to closed position, and when said horizontal shaft 82 is turned to cause said adjustable lower and upper closure elements 78 and 80 to move to open positions, said adjustable cap also is moved to open position. The adjustable cap 72 is held against rotative movement during opening and closing adjustment by a guide rod 114 upon the adjacent vertical side wall 56 slidable in a guide opening 115 in the extension of said adjustable cap 72. Evidently, rotative movement is imparted to the second horizontal shaft 108 in response to turning movement of the horizontal shaft 82 through the instrumentality of the sprocket wheel 105, the sprocket chain 106 and the sprocket wheel 107.

Obviously, when the blower 76 is in operation while the adjustable cap 72, the adjustable lower closure element 78 and the adjustable upper closure element 80 are in open condition, air will be forced through the housing 20. Portions of the forced air will travel around and over the main electric motor 14, the automatic brake 18, the control panel 16, the resistors 17 and the heat insulator 67. The air circulated by the blower 76 of course will enter the blower casing 70 and the interior of the housing 20 by way of the opening which the adjustable cap 72 normally is adapted to cover and will leave the interior of said housing 20 by way of both of the openings 77 and 79 which the adjustable lower and upper closure elements 78 and 80, respectively, normally are adapted to cover.

The material handling apparatus incorporates a more or less complicated electrical system, not necessary to be disclosed and described in detail, including a multiplicity of lead wires to and from the main electric motor 14, the controller 15, the control panel 16, the resistors 17, the automatic brake 18 and the blower motor 73. Evidently, the bulk of the necessary electrical equipment, especially terminals, will be enclosed in the water-tight housing 20, and for this reason the wiring and conduit required will be substantially a minimum.

The electrical system of the material handling apparatus incorporates a construction and arrangement for insuring that the main electric motor 14 possibly can be energized, thus to be set in operation to actuate the main drum 25 and the winch head 27 of the cargo winch 13, only when the adjustable cap 72, the adjustable lower closure element 78 and the adjustable upper closure element 80 are in open condition. And, too, said electrical system desirably will include a construction and arrangement for insuring that the blower motor 73 will be energized, thus to actuate the blower 76, at all times when said adjustable cap 72 and said adjustable elements 78 and 80 are in open condition and will be de-energized at all times when the cap 72 and the elements 78 and 80 are in closed condition.

Incoming wires 116 and 117 are from a source (not shown) of electrical energy.

A lead wire 118 extends from the incoming wire 116 to a fixed contact member 119 of a limit switch 120 also including a fixed contact member 121 spaced from the fixed contact member 119.

A movable contact member 122 of said limit switch 120 is adapted to bridge the fixed contact members 119 and 121. A lead wire 123 extends from the fixed contact member 121 to the blower motor 73, and a lead wire 124 extends between said blower motor 73 and the incoming wire 117. Lead wires 125 and 126 to the control panel 16 extend from the lead wires 123 and 124, respectively.

The fixed contact members 119 and 121 of the limit switch 120 are insulatively supported upon the cross-strip 98 beneath the adjustable upper closure element 80, and the movable contact member 122 has its intermediate portion pivotally, insulatively supported, as at 127, upon said cross-strip 98. A leaf spring 128 resiliently urges an actuator 129 of the movable contact member 122 in direction toward said adjustable upper closure element 80 and also urges terminals of said movable contact member 122 in direction toward said fixed contact members 119 and 121. The leaf spring 128 is adapted resiliently to retain the movable contact member 122 in bridging engagement with the fixed contact members 119 and 121 at all times when the adjustable upper closure element 80 is in open position, as in Fig. 5, or when the cover 58 is removed, as in Fig. 6, and said adjustable upper closure element 80 is adapted to come into engaging relation with the actuator 129 during closing movement of the adjustable upper closure element 80 and cause said movable contact member 122 to be removed from engaging relation with said fixed contact members 119 and 121 against the resilient action of said leaf spring 128. In short, whenever the adjustable upper closure element 80 is in open position, the limit switch 120 is in closed condition, and whenever said adjustable upper closure element is in closed position, said limit switch 120 is in open condition.

As illustrated and described, the limit switch 120 is incorporated in the power circuit, including the incoming wires 116 and 117, the lead wires 123 and 124, and the lead wires 125 and 126, of the material handling apparatus, to the control panel 16, and thus, said control panel cannot be energized, or made live, unless said limit switch is closed. The main electric motor 14 is connected in the power circuit through and only through the medium of the control panel 16. Hence, said main electric motor can be energized only when the limit switch 120 is in closed condition.

It is obvious that the blower motor 73 will be energized at all times when the limit switch 120 is in closed condition and will be de-energized at all times when said limit switch is in open condition. Of course, a manual on and off switch (not shown) for the blower motor can be employed.

Material handling apparatus of the general nature as illustrated and described heretofore has included, for each cargo winch, such as 13, to be operated, each of an operating electric motor, such as 14, a controller, such as 15, a control panel, such as 16, a set of resistors, such as 17, and an automatic brake, such as 18, as well as additional elements required to the production of an operative structure. In each instance, the control panel and set of resistors have been incorporated in a separate deck house, or separate deck houses, occupying valuable deck space, and the operating electric motor with automatic brake has been required to be water-tight. The placing of the control panel 16 and the resistors 17 within the water-tight housing 20 eliminates the necessity of providing separate deck houses for said control panel and resistors, and the placing of the main electric motor 14 and the automatic brake 18 within said water-tight housing eliminates the necessity of providing a water-tight operating electric motor with automatic brake.

The material handling apparatus here presented is quite compact and is capable of conserving considerable deck space upon a vessel which can be employed to the purpose of receiving cargo. And, too, said material handling apparatus is of simpler structure and can be manufactured more inexpensively than can more or less similar material handling apparatus of the prior art. The lack of necessity for a water-tight operating electric motor with automatic brake has been mentioned. Clearly, a water-tight electric motor is considerably more expensive than is the main electric motor 14. By elimination of necessity for deck houses, the cost of building a cargo transporting vessel including the material handling apparatus of the invention is obviously reduced.

Inasmuch as the bulk of the electrical equipment, including terminals, is contained within the water-proof housing 20, a considerable amount of wiring and conduit as necessitated with prior art apparatuses, and the expense of said wiring and conduit and its installation, is eliminated.

The provision of steel plate, instead of casting, for the bed 21 and side frames 22 of the cargo winch 13, as well as for the gear case 31, constitutes a distinct advantage, as does also the employment of steel plate for the rectilinear frame 55 and the water-proof housing 20 with removable cover 58. The steel plate employed, while rendering the material handling apparatus considerably stronger than would otherwise be the case, causes said material handling apparatus to have weight considerably less than it would have if it incorporated a cargo winch composed in the main of casting. The cargo winch 13 has maximum strength and rigidity and minimum weight. The closed gear case 31, while quite strongly constructed, is of inconsiderable weight.

The mounting surfaces for the main electric motor 14 desirably are machined so that the gearing will mesh properly and actuation of the main drum 25 and the winch head 27 of the cargo winch will be accurate.

It will be understood that when the material handling apparatus is out of use, the water-tight housing 20 will be completely closed. The adjustable cap 72, the adjustable lower closure element 78 and the adjustable upper closure element 80 will be situated in closed condition when the material handling apparatus is intended to be inoperative, as, for example, when a cargo transporting vessel equipped with said material handling apparatus is in transit. When it is desired that the material handling apparatus be put to work, as to load or unload the cargo transporting vessel, it will be necessary first to move the adjustable cap 72 and the adjustable lower and upper closure elements 78 and 80 to open condition. Otherwise, the main electric motor 14 cannot be energized. Upon the movement of said cap 72 and said elements 78 and 80 to open condition, said main electric motor is rendered capable of being selectively inoperative or connected in the power circuit to be operated at predetermined speed, through the instrumentality of cooperating mechanism of the controller 15, the control panel 16 and the resistors 17, in well known manner.

In the disclosed embodiment of the invention, the blower motor 73 will be inoperative at all times when the cap 72 and the elements 78 and 80 are in closed condition and will be operative at all times when said cap and elements are in open condition. As before mentioned, a hand switch (not shown) can be employed to render the blower motor inoperative while said cap 72 and said elements 78 and 80 are in open condition.

What is claimed is:

1. In material handling apparatus including an entity to be actuated, an operating electric motor for said entity, means including a control panel and resistors for controlling said operating electric motor, a single housing containing said operating electric motor, control panel and resistors, said operating electric motor and said resistors being disposed at opposite sides of said control panel, and a heat insulator in said housing between said control panel and resistors.

2. In material handling apparatus including an entity adapted to be actuated, an operating electric motor for said entity, an automatic brake for said operating electric motor, means including a control panel and resistors for controlling said operating electric motor and automatic brake, a housing containing said operating electric motor, automatic brake, control panel and resistors, and a heat insulator in said housing between said control panel and resistors.

3. In material handling apparatus including an entity to be actuated, an operating electric motor for said entity, an automatic brake for said operating electric motor, means including a control panel and resistors for controlling said operating electric motor and automatic brake, a water-tight housing containing said operating electric motor, automatic brake, control panel and resistors, means for providing ventilating openings through said housing, and a blower for forcing air through said housing to cause said operating electric motor, automatic brake, control panel and resistors to be ventilated.

4. In material handling apparatus including an entity to be actuated, an operating electric motor with automatic brake for said entity, a water-tight housing for said operating electric motor with automatic brake, and a control panel, a heat insulator and resistors in said water-tight housing, said control panel being situated between said operating electric motor with automatic brake and said resistors, and said heat insulator being situated between said control panel and said resistors.

5. The combination as specified in claim 4, means for causing said water-tight housing to be opened up, and a blower for forcing air through said housing in ventilating relation to said operating electric motor with automatic brake, said control panel, said heat insulator and said resistors.

6. In material handling apparatus including an entity to be actuated, an operating electric motor for said entity, means including a circuit, a limit switch for said circuit, a control panel and resistors for controlling said operating electric motor, a housing containing said operating electric motor, control panel and resistors, closure elements for said housing, means for adjusting said closure elements to cause said housing selectively to be opened up and said limit switch to be in the closed condition of said circuit and said housing to be closed and said limit switch to be in the open condition of said circuit, and a blower for causing the interior of said housing to be ventilated.

7. In material handling apparatus including an entity to be actuated, an operating electric motor for said entity, means including a control panel and resistors for controlling said operating electric motor, a water-tight housing containing said operating electric motor, control panel and resistors in substantially open relation to each other, said operating electric motor and said resistors being disposed at opposite sides of said control panel, a heat insulator in said housing between said control panel and resistors, means for providing ventilating openings through said housing, and a blower for ventilating said operating electric motor, control panel, resistors and heat insulator and the interior of said housing.

8. In material handling apparatus including an entity to be actuated, an operating electric motor for said entity, means including a circuit, a limit switch for said circuit, a control panel and resistors for controlling said operating electric motor, a water-tight housing containing said operating electric motor, control panel and resistors in substantially open relation to each other, a heat insulator within said housing and disposed between said control panel and resistors, a closure element for said housing, means for adjusting said closure element to cause said housing selectively to be opened up and said limit switch to be in the closed condition of said circuit and said housing to be closed and said limit switch to be in the open condition of said circuit, and means for causing said operating electric motor, control panel, resistors and heat insulator and the interior of said housing to be ventilated.

9. In material handling apparatus including an entity to be actuated, an operating electric motor for said entity, means including a circuit, a limit switch for said circuit, a control panel and resistors for controlling said operating electric motor, a housing containing said operating electric motor, control panel and resistors, means adapted to be adjusted to cause said housing selectively to be opened up and said limit switch to be in the closed condition of said circuit and said housing to be closed and said limit switch to be in the open condition of said circuit, and means adapted to be operative when the housing is opened up to cause the interior of said housing to be ventilated.

10. In material handling apparatus including an entity to be actuated, an operating electric motor for said entity, means including a circuit, a limit switch for said circuit, a control panel and resistors for controlling said operating electric motor, a housing containing said control panel and resistors, closure elements for said housing, means for adjusting said closure elements to cause said housing selectively to be opened up and said limit switch to be in the closed condition of said circuit and said housing to be closed and said limit switch to be in the open condition of said circuit, and a blower for causing the interior of said housing to be ventilated.

11. In material handling apparatus including an entity to be actuated, an operating electric motor for said entity, means including a circuit, a limit switch for said circuit, a control panel and resistors for controlling said operating electric motor, a housing containing said control panel and resistors, means adapted to be adjusted to cause said housing selectively to be opened up and said limit switch to be in the closed condition of said circuit and said housing to be closed and said limit switch to be in the open condition of said circuit, and means adapted to be operative when the housing is opened up to cause the interior of said housing to be ventilated.

12. In material handling apparatus including an entity to be actuated, an operating electric motor for said entity, means including a circuit, a limit switch for said circuit, a control panel and resistors for controlling said operating electric motor, a housing containing said control panel and resistors in substantially open relation to each other, a heat insulator within said housing and disposed between said control panel and resistors, a closure element for said housing, means for adjusting said closure element to cause said housing selectively to be opened up and said limit switch to be in the closed condition of said circuit and said housing to be closed and said limit switch to be in the open condition of said circuit, and means for causing said control panel, resistors and heat insulator and the interior of said housing to be ventilated.

13. In material handling apparatus including an entity to be actuated, an operating electric motor for said entity, an automatic brake for said operating electric motor, means including a circuit, a control panel and resistors for controlling said operating electric motor and automatic brake, a housing containing said control panel and resistors, a blower for forcing air to cause said resistors to be ventilated, a switch adapted selectively to be in the open and the closed conditions of said circuit, a closure element for said housing, and means for adjusting said closure element to cause said housing selectively to be opened up and said switch to be in the closed condition of said circuit and said housing to be closed and said switch to be in the open condition of said circuit.

ROLF E. LJUNGKULL.